US008079314B2

(12) United States Patent
MacLean et al.

(10) Patent No.: US 8,079,314 B2
(45) Date of Patent: Dec. 20, 2011

(54) CONNECTION SYSTEM

(75) Inventors: Tim J. MacLean, Bath (GB); Nick Savage, Bath (GB); Martin P. Bloomfield, Bath (GB)

(73) Assignee: Herman Miller, Inc., Zeeland, MI (US)

( * ) Notice: Subject to any disclaimer, the term of this patent is extended or adjusted under 35 U.S.C. 154(b) by 760 days.

(21) Appl. No.: 11/957,889

(22) Filed: Dec. 17, 2007

(65) Prior Publication Data
US 2008/0149007 A1 Jun. 26, 2008

Related U.S. Application Data

(60) Provisional application No. 60/876,054, filed on Dec. 20, 2006.

(51) Int. Cl.
*A47B 13/00* (2006.01)
*A47B 91/00* (2006.01)
(52) U.S. Cl. .................................. 108/158.11; 108/155
(58) Field of Classification Search .................. 108/155, 108/154, 157.17, 158.11, 50.01, 50.02, 64; 285/913, 92; 248/188.5, 407, 408
See application file for complete search history.

(56) References Cited

U.S. PATENT DOCUMENTS

| 561,212 A | 6/1896 | Epstein | 108/34 |
| 586,276 A | 7/1897 | Seelinger | 108/156 |
| 931,327 A | 8/1909 | Menzel | 279/93 |
| 1,745,302 A | 1/1930 | Jones | |
| 2,527,256 A | 10/1950 | Jackson | 403/319 |
| 2,709,818 A | 6/1955 | Freese | 5/332 |
| 3,079,120 A | 2/1963 | Schwartz | 248/188 |
| 3,092,406 A | 6/1963 | Wasserstrom | 287/20 |
| 3,131,899 A | 5/1964 | Luhrs | 248/188 |
| 3,179,071 A | 4/1965 | Johnston | 108/144 |
| 3,236,389 A | 2/1966 | Murdock | 211/133 |
| 3,266,840 A | 8/1966 | D'Estrube | 297/157 |
| 3,335,471 A | 8/1967 | Seckerson et al. | 24/221 |

(Continued)

FOREIGN PATENT DOCUMENTS
DE 205175 3/1907
(Continued)

OTHER PUBLICATIONS

Communication Relating to the Results of the International Search Report and the Written Opinion of the International Searching Authority for PCT/US2007/087784 dated Nov. 3, 2008.

(Continued)

*Primary Examiner* — Darnell Jayne
*Assistant Examiner* — Andres F Gallego
(74) *Attorney, Agent, or Firm* — Brinks Hofer Gilson & Lione

(57) ABSTRACT

A connection system includes a float assembly and a locking assembly. The float assembly includes a floating ring and a float retainer disposed against the floating ring. The float retainer is adapted to be secured to a first object. The locking assembly includes a locking collar and a base retainer. The base retainer is coupled to the locking collar and adapted to be attached to a second object. The base retainer includes an engagement member engaging the floating ring, with the float retainer disposed between the floating ring and the locking assembly. The locking assembly is moveable between a first configuration wherein the float retainer is moveable relative to the locking assembly and a second configuration wherein the float retainer is fixed relative to the locking assembly.

15 Claims, 13 Drawing Sheets

U.S. PATENT DOCUMENTS

| | | | |
|---|---|---|---|
| 3,339,609 A | 9/1967 | Cushman | |
| 3,376,068 A | 4/1968 | Walkinshaw | 297/437 |
| 3,395,934 A * | 8/1968 | Capistrano et al. | 285/23 |
| 3,469,870 A | 9/1969 | Barkus | 287/58 |
| 3,478,302 A | 11/1969 | Chirumbolo | 439/314 |
| 3,730,109 A | 5/1973 | Kreizel et al. | 108/156 |
| 3,869,218 A | 3/1975 | Stoeber et al. | 403/241 |
| 4,011,821 A | 3/1977 | Neal | 108/156 |
| 4,127,224 A | 11/1978 | Newman, Sr. | 226/3 |
| 4,305,180 A | 12/1981 | Schwartz | 439/296 |
| 4,329,076 A | 5/1982 | Coreth | 403/109 |
| 4,444,125 A | 4/1984 | Welsch et al. | 108/155 |
| 4,474,488 A | 10/1984 | Pinkerton et al. | 403/24 |
| 4,691,885 A * | 9/1987 | Lawrance | 248/165 |
| 4,793,611 A | 12/1988 | Thornell | 273/1.5 R |
| 4,893,426 A | 1/1990 | Bixler | 42/75.01 |
| 4,929,136 A | 5/1990 | Mee | |
| 5,014,923 A | 5/1991 | Robertson | 242/55 |
| 5,074,224 A | 12/1991 | Stascheit | 108/156 |
| 5,186,197 A | 2/1993 | Lavine | 135/25.4 |
| 5,215,336 A * | 6/1993 | Worthing | 285/81 |
| 5,417,511 A | 5/1995 | Warden | 403/109 |
| 5,513,622 A | 5/1996 | Musacchia | 124/89 |
| 5,617,798 A | 4/1997 | Lytell | 108/144 |
| 5,657,525 A | 8/1997 | Hoyt, III et al. | 29/407.01 |
| 5,741,084 A | 4/1998 | Del Rio et al. | 403/349 |
| 5,868,533 A | 2/1999 | Fiala | 408/226 |
| 5,871,239 A * | 2/1999 | Boscaljon et al. | 285/81 |
| 6,007,268 A | 12/1999 | Whittington et al. | 403/328 |
| 6,016,756 A * | 1/2000 | McMahon et al. | 108/158 |
| 6,213,677 B1 * | 4/2001 | Yamane et al. | 403/329 |
| 6,499,907 B1 | 12/2002 | Baur | 403/188 |
| 6,629,506 B2 | 10/2003 | Park | 108/156 |
| 0,231,927 A1 | 12/2003 | Hale | 403/349 |
| 6,659,410 B1 | 12/2003 | Lu | 48/188 |
| 6,739,560 B1 * | 5/2004 | Pajerski | 248/188.5 |
| 6,776,106 B2 | 8/2004 | Lin | 108/157.1 |
| 6,817,303 B2 * | 11/2004 | Gosselin | 108/131 |
| 6,869,245 B2 | 3/2005 | Cabiran | 403/188 |
| 6,920,834 B1 * | 7/2005 | Pehta et al. | 108/147.21 |
| 7,044,863 B1 | 5/2006 | Brewster | 473/129 |
| 2002/0089176 A1 * | 7/2002 | Iwasaki | 285/92 |
| 2006/0278139 A1 | 12/2006 | Korb | |
| 2007/0267869 A1 * | 11/2007 | Patel | 285/386 |
| 2009/0180830 A1 | 7/2009 | MacLean | |

FOREIGN PATENT DOCUMENTS

| | | |
|---|---|---|
| DE | 28 17 734 A1 | 11/1978 |
| DE | 19518007 C1 | 7/1996 |
| DE | 198 12 300 A1 | 9/1999 |
| DE | 199 60 199 A1 | 6/2001 |
| FR | 770609 A | 9/1934 |
| FR | 1328462 A | 5/1963 |
| FR | 1411799 A | 9/1965 |
| FR | 2 554 522 | 5/1985 |
| GB | 832943 A | 4/1960 |
| JP | 2001-182723 | 7/2001 |
| WO | WO 2004/036060 A1 | 4/2004 |
| WO | WO 2004/111472 | 12/2004 |
| WO | WO 2006031386 A2 * | 3/2006 |
| WO | WO 2008/079778 A3 | 7/2008 |

OTHER PUBLICATIONS

Communication Relating to the Results of the Partial Search Report for PCT/US2007/087784 dated Jul. 8, 2008.

International Search Report and the Written Opinion of the International Searching Authority for PCT/US2009/030389 dated Jun. 4, 2009, 12 pages.

Communication Relating to the Results of the Partial Search Report for PCT/US2007/087784 dated Jul. 8, 2008.

International Search Report and the Written Opinion of the International Searching Authority for PCT/US2007/087784 dated Nov. 3, 2008.

* cited by examiner

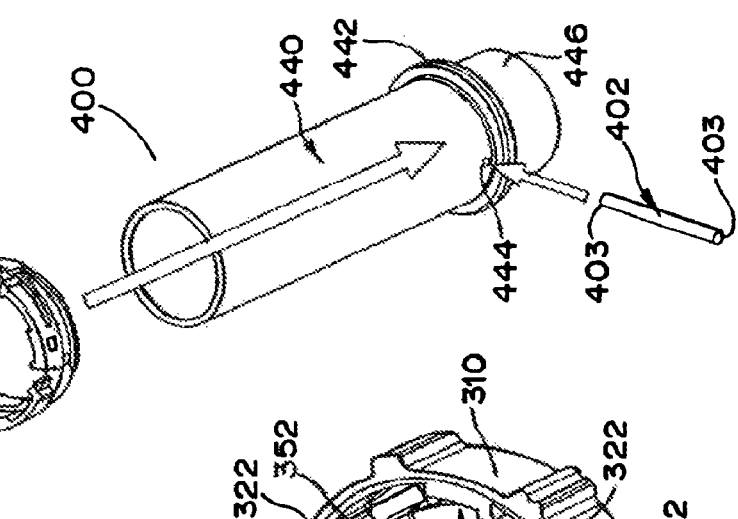
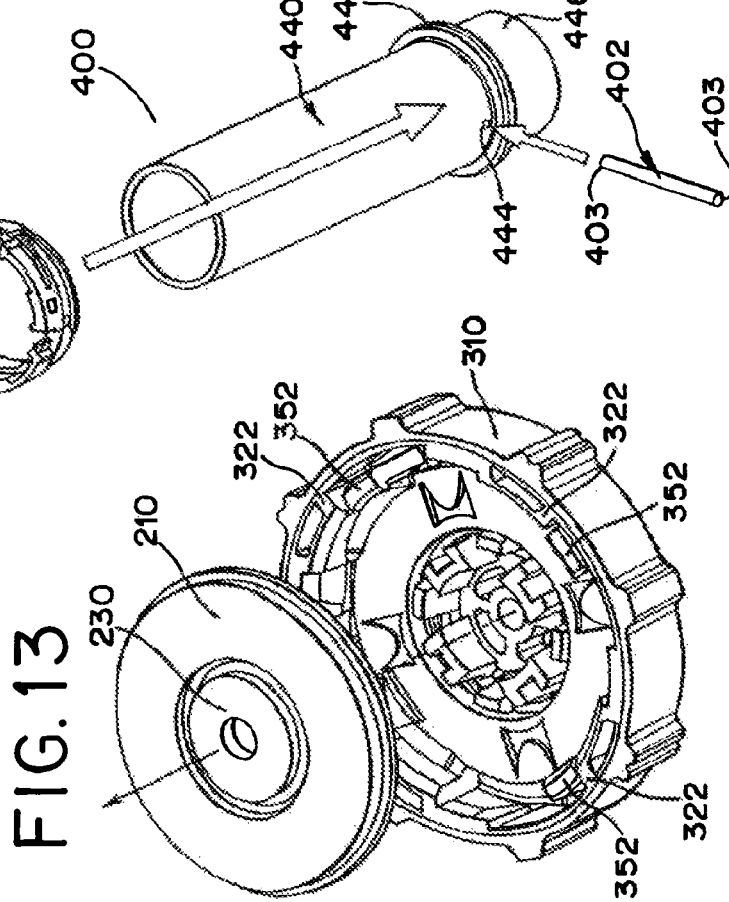
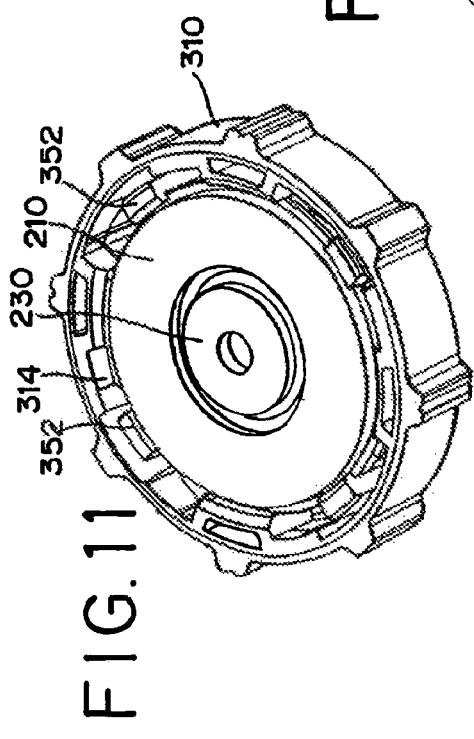
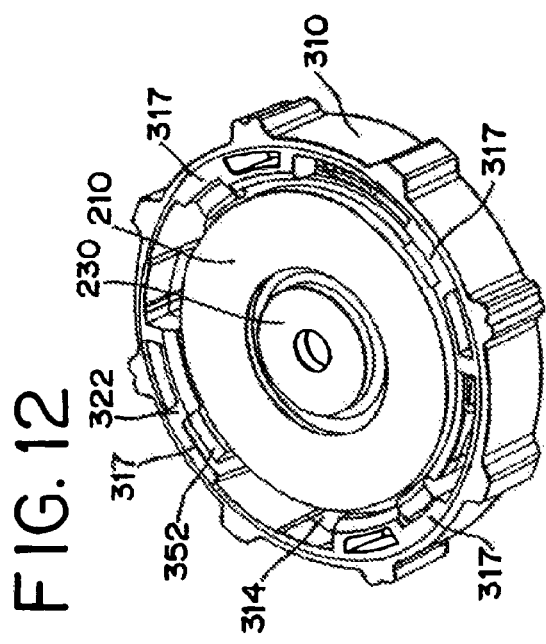

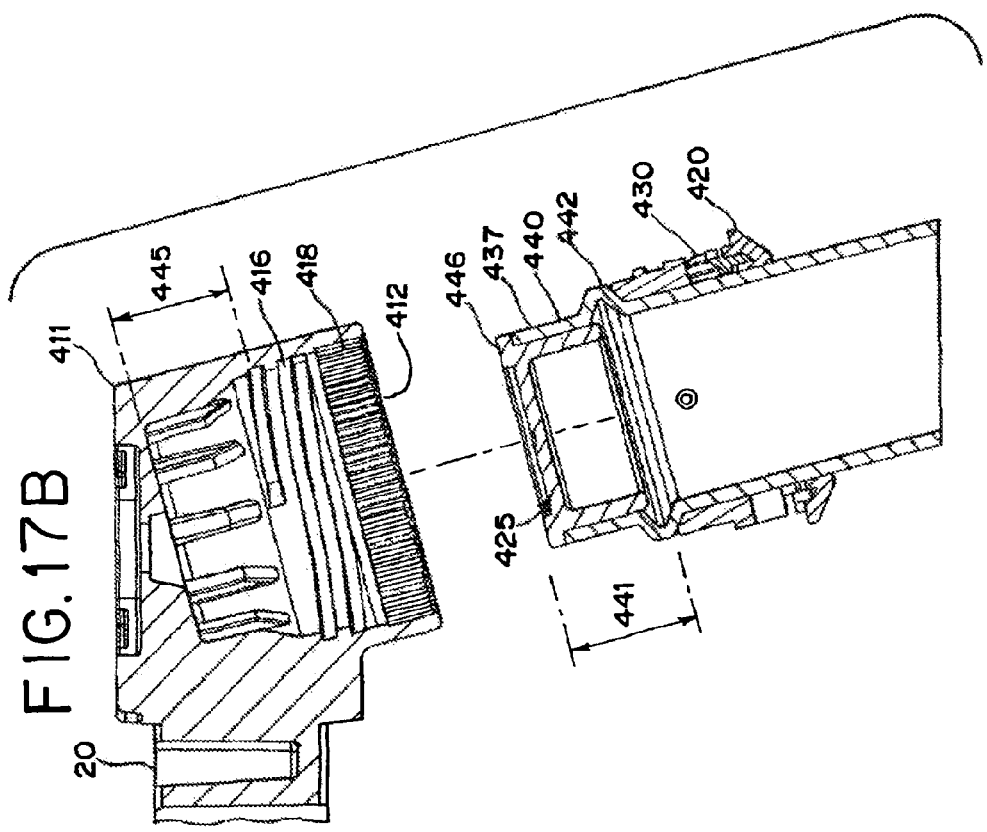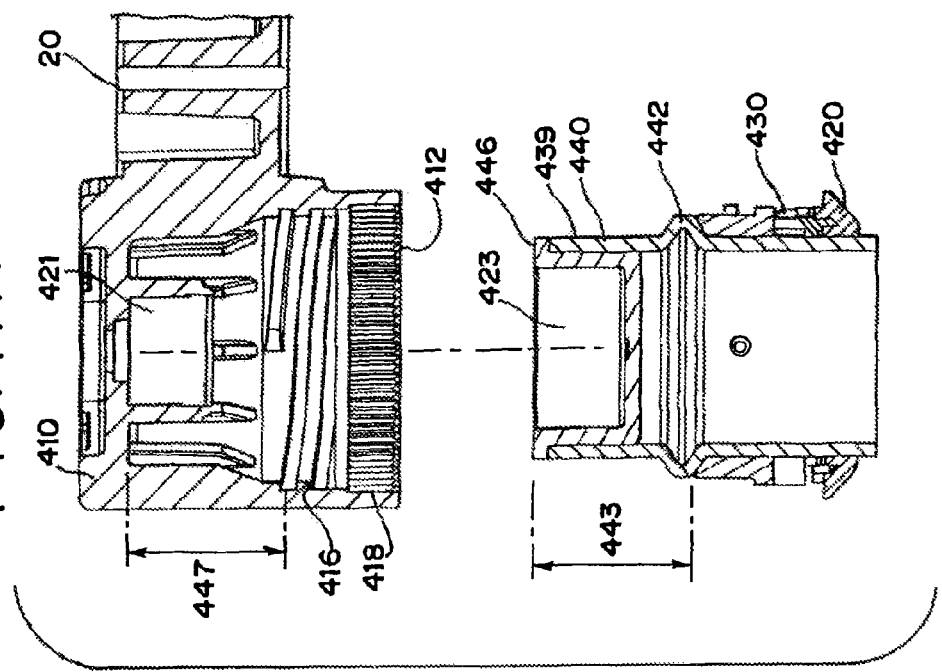

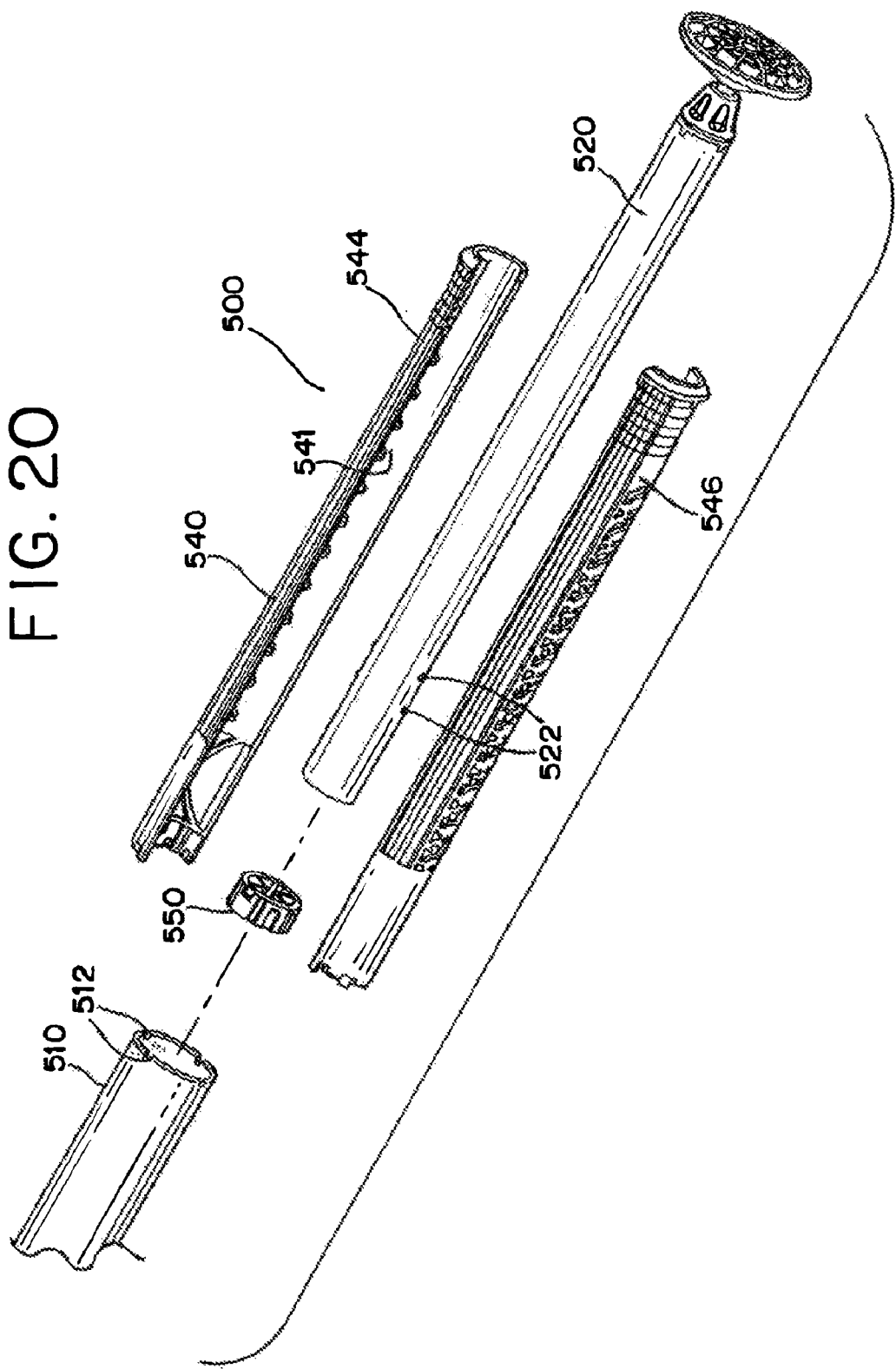

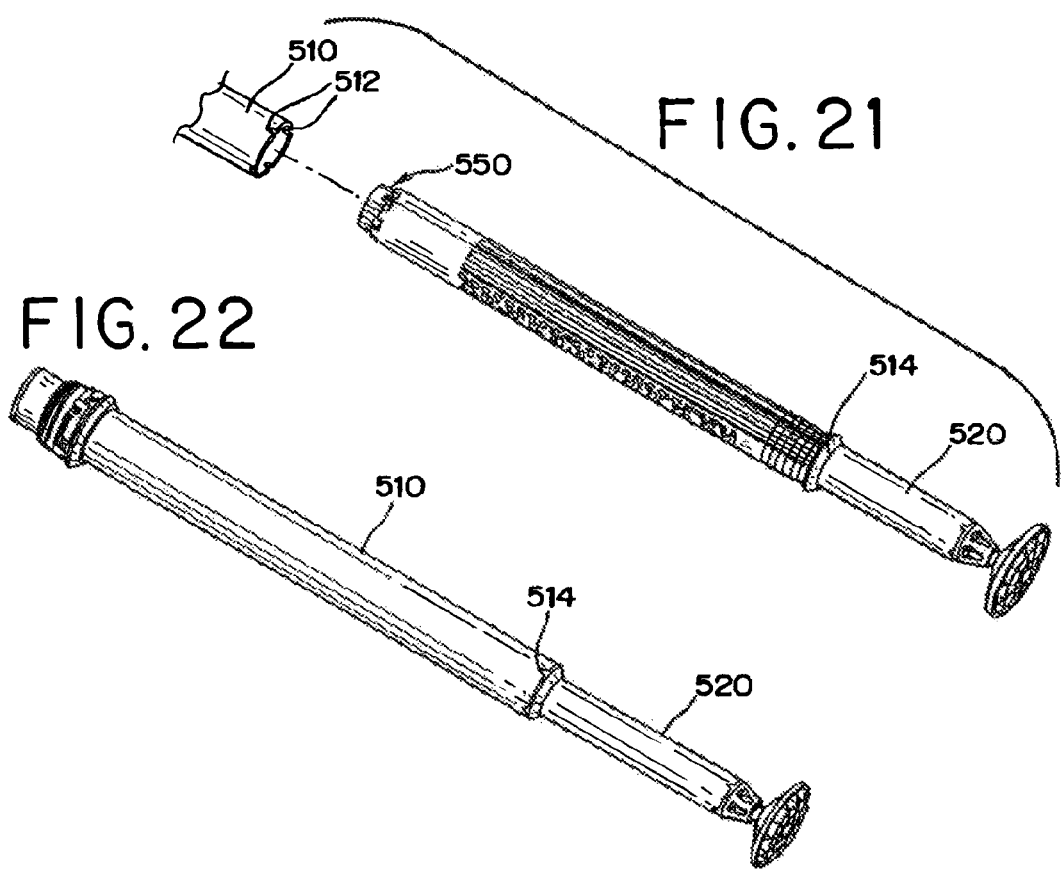
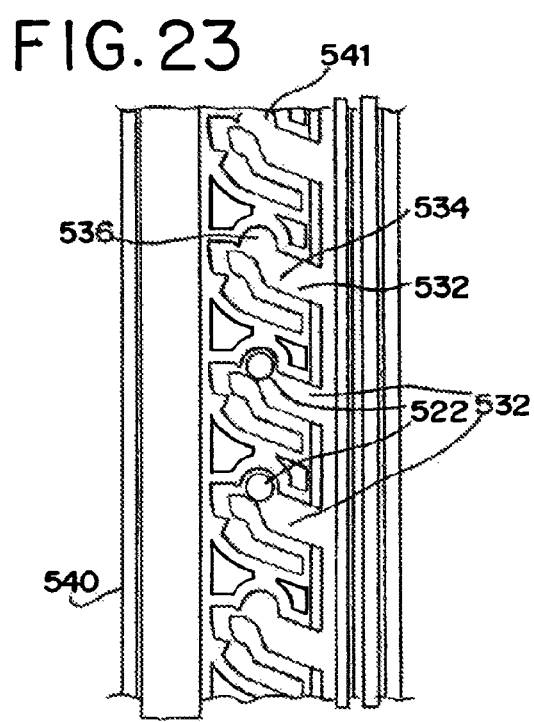
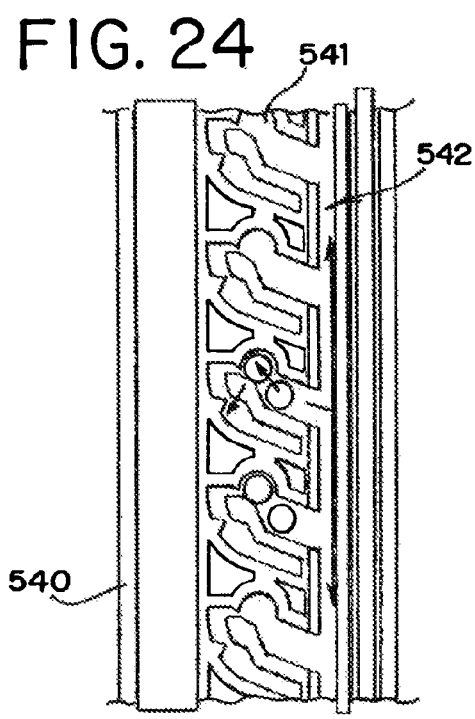

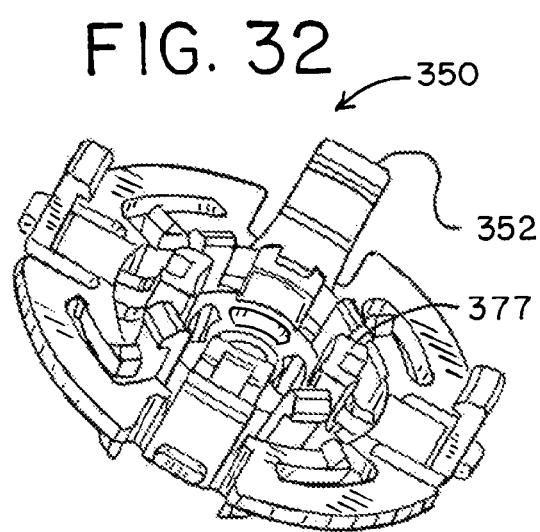
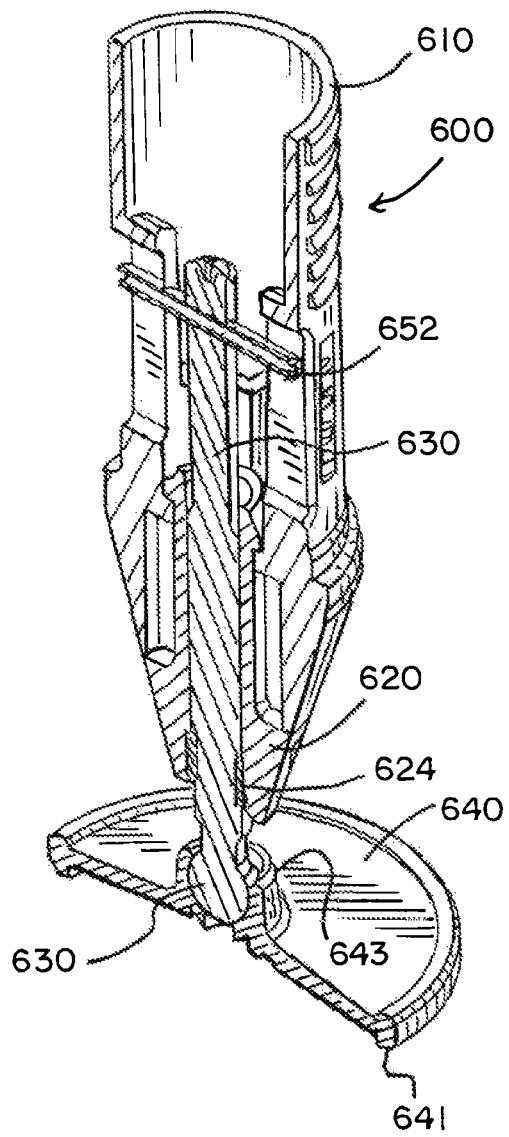

CONNECTION SYSTEM

This application claims the benefit of U.S. Provisional application No. 60/876,054, filed Dec. 20, 2006 and entitled "Connection System," the entire disclosure of which is hereby incorporated herein by reference.

FIELD OF THE INVENTION

The present invention relates to a system for connecting two or more components, and in particular to a connection system for various furniture components including a work surface and a support for the work surface.

BACKGROUND

Typically, furniture components and other work space systems are shipped unassembled and then assembled at the work site. Additionally, furniture components are often disassembled, moved to another location, and reassembled, The assembly and disassembly of the components requires the use of tools and other additional components, and may require skilled technicians.

BRIEF SUMMARY

In various aspects, a system of easily assembled furniture components is provided.

In one aspect, one embodiment of a connection system includes a float assembly and a locking assembly. The float assembly includes a floating ring and a float retainer disposed against the floating ring. The float retainer is adapted to be secured to a first object. The locking assembly includes a locking collar and a base retainer. The base retainer is coupled to the locking collar and adapted to be attached to a second object. The base retainer includes an engagement member engaging the floating ring, with the float retainer disposed between the floating ring and the locking assembly. The locking assembly is moveable between a first configuration wherein the float retainer is moveable relative to the locking assembly, and a second configuration wherein the float retainer is fixed relative to the locking assembly.

In another aspect, one embodiment of a furniture leg attachment system includes a plug member, a leg tube, and a collar. The plug member includes an opening and an interior surface including a threaded portion and toothed portion. The leg tube includes a circumferential shoulder. A first end of the leg tube is disposed in the opening of the plug member. A collar is disposed around the leg tube adjacent the circumferential shoulder and is axially slidable and rotationally fixed with respect to the leg tube. The collar includes a threaded portion configured to engage the threaded portion of the plug member, a ratchet mechanism configured to engage the toothed portion of the plug member, and a release mechanism disposed adjacent the collar and configured to release the ratchet mechanism.

In another aspect, one embodiment of a height adjustable leg assembly includes an upper leg tube, a lower leg tube, and a sleeve. The lower leg tube supports the upper leg tube and includes at least one pin radially extending from the lower leg tube. The sleeve is disposed around at least a portion of the lower leg tube and includes a vertical channel. The pin is axially moveable in the vertical channel. A plurality of recesses is in communication with the vertical channel and configured to engage the at least one pin with a snap fit connection. The lower leg tube is moveable from a first configuration where the lower leg tube slides vertically with respect to the sleeve, and a second configuration wherein the lower leg tube is vertically fixed with respect to the sleeve.

In another aspect, one embodiment of a glide assembly includes a leg insert, a collar, a shaft, and a base. The leg insert includes a central channel. The collar includes a threaded channel and is disposed in the central channel of the leg insert, and rotationally connected thereto. The shaft includes a threaded portion engaging the threaded channel of the collar. The base is connected to the shaft.

The various aspects provide significant advantages over conventional connection systems, including height adjustment and easy assembly and disassembly without the use of tools.

BRIEF DESCRIPTION OF THE DRAWINGS

FIG. 11 is a perspective view of the locking assembly of the connection system of FIG. 10 with the float assembly inserted in a load configuration.

FIG. 12 is a perspective view of the locking assembly of the connection system of FIG. 10 with the float assembly inserted in a locked configuration.

FIG. 13 is a perspective view of the locking assembly of the connection system of FIG. 10 with the float assembly inserted in a release configuration.

FIG. 14 is an exploded view of an embodiment of a leg attachment system.

FIG. 17A is a side sectional schematic view of an embodiment of a plug member and leg tube.

FIG. 17B is a side sectional schematic view of another embodiment of a plug member and leg tube.

FIG. 20 is an exploded view of an embodiment of a height adjustable leg assembly.

FIG. 21 is a perspective view of the height adjustable leg assembly of FIG. 20.

FIG. 22 is a perspective view of the height adjustable leg assembly of FIG. 20 in an assembled configuration.

FIG. 23 is a side cross section of the height adjustable leg assembly of FIG. 20, showing an assembled configuration FIG. 24 is a side cross section of the height adjustable leg assembly of FIG. 20 showing the movement in the process of height adjustment.

FIG. 32 is a perspective view an alternative embodiment of a base retainer.

FIG. 33 is a side sectional view of an alternative embodiment of a glide assembly.

DETAILED DESCRIPTION OF THE PRESENTLY PREFERRED EMBODIMENTS

Figure 1:
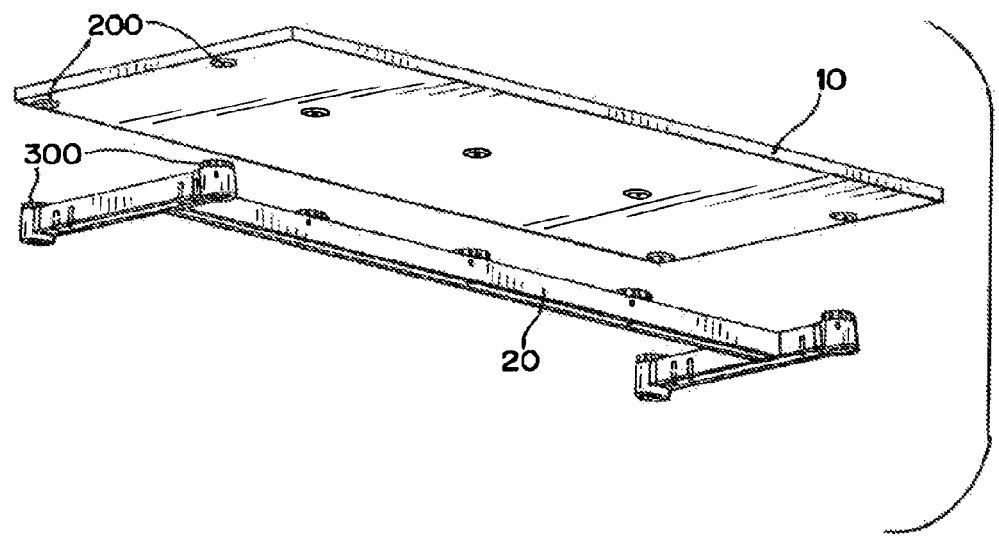
FIG. 1 is an exploded view of an embodiment of a work surface and a support structure.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings.

The present invention provides a system of easily assembled components. In one aspect of the system, shown in FIG. 1, a support 20 is provided for a work surface 10. The support 20 is connected to the work surface 10 by a connection system 100, which includes a float assembly 200 connected to the work surface 10 and a locking assembly 300 connected to the support 20. In another aspect of the system, shown in FIG. 2, a multifunctional leg system is provided. The furniture system includes a leg attachment system 400 (including an upper leg tube 440), a leg height adjustment assembly 500 (including lower leg tube 520), and glide assembly 600. The leg tubes 440, 520 and glide 600 are configured to connect to support 20. The furniture system may include some or all of the components described herein. A benefit of the system is that parts and sub-assemblies may be delivered on-site and assembled by hand without the need for tools.

Figure 3A:
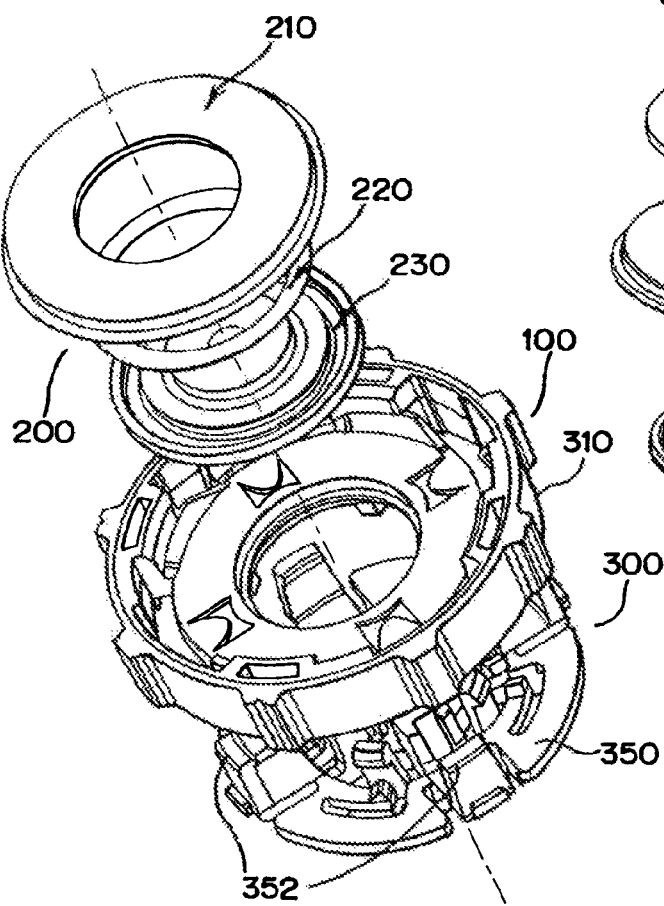
FIG. 3A is an exploded view of an embodiment of a connection system.

The components of the connection system 100 are shown in FIG. 3A. The connection system 100 includes a float assembly 200 and locking assembly 300. The float assembly 200 includes a floating ring 210, a float retainer 230 disposed against the floating ring 210 and configured to be secured to a first object (such as work surface 10), and a seal ring 220 disposed between the floating ring 210 and the float retainer 230. The locking assembly 300 includes a locking collar 310 and a base retainer 350. The locking collar 310 includes one or more apertures 312 (see FIG. 4). The base retainer 350 is configured to be attached to a second object (such as support 20). The base retainer 350 includes one or more engagement members 352 configured to engage the floating ring 210.

The locking assembly 300 is moveable between various configurations in order to load, lock, and release the float assembly 200. In the first or load configuration, the engagement members 352 engage the floating ring 210, with the float retainer 230 and locking collar 310 disposed between the floating ring 210 and the base retainer 350. In the load configuration, the float retainer 230 is moveable relative to the locking assembly 300. In the second or lock configuration, the outer engagement members 352 engage the floating ring 210 and the float retainer 230 therebetween such that the float retainer 230 is fixed relative to the locking assembly 300. In a third or release configuration, the outer engagement members 352 are deflected radially outwards, allowing the release of the float assembly 200.

Figure 4:
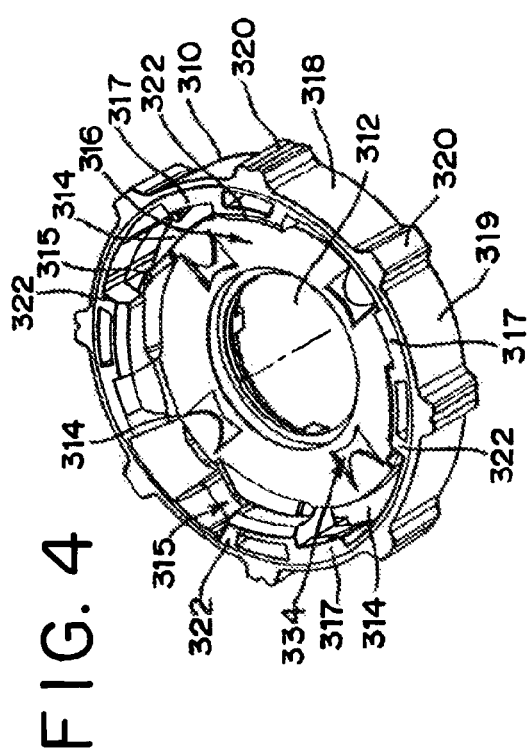
FIG. 4 is a top perspective view of the locking collar of the connection system FIG. 3A.

An embodiment of the locking collar 310 is shown in FIG. 4. The locking collar 310 includes a central aperture 312 and at least one outer aperture or slot 314. The locking collar 310 includes an inner ring 316 surrounding the central aperture 312. The locking collar 310 may include an outer cylindrical wall 318. The outer apertures or slots 314 may be disposed between the inner ring 316 and the outer cylindrical wall 318. The slots 314 are defined in part by stops or end walls 322. The locking collar 310 and base retainer 350 may exhibit a radial symmetry. For example, the embodiment shown in FIG. 4 includes four substantially identical slots 314 distributed around the locking collar 310. Other numbers of slots 314 and other features are possible. The outer surface 319 of the outer cylindrical wall 318 may include gripping ridges 320. Gripping ridges 320 may allow the locking collar 310 to be turned by hand; however, tools may also be used.

Figure 31:
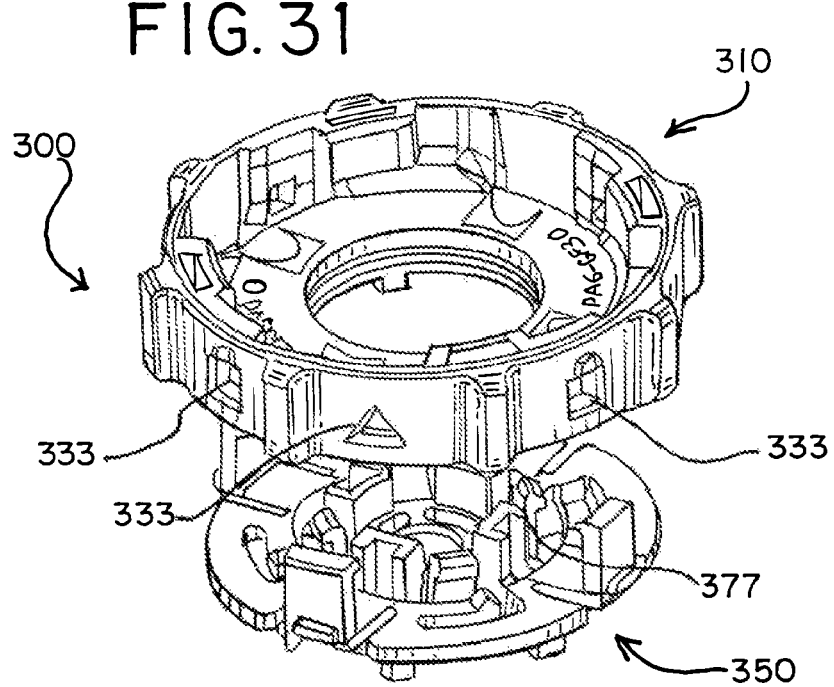
FIG. 31 is a perspective view of an alternative embodiment of a locking assembly.

In an alternative embodiment, as illustrated in FIG. 31, the locking collar 310 may also contain apertures 333 on the outer cylindrical wall 318. These apertures 333 provide a user feedback about the configuration of the assembly by allowing the user a window into the locking collar 310. As the locking collar 310 is turned, the white back of the engagement member or retaining clip 352 can be seen through the aperture 333. The retaining clip 352 may also have properly placed symbols viewable through the aperture 333 to indicate the assembly is locked, or to indicate it is ready for release.

The locking collar 310 may include an outwardly radially ramped surface 315 adjacent to the slots 314, such that in a configuration, the engagement members 352 are pushed radially outwards to disengage the floating ring 210. The locking collar 310 may include wall portions 317 that narrow slots 314 inwardly, such that the engagement members 352 are urged inwardly and downwards in a locked configuration.

Figure 5:
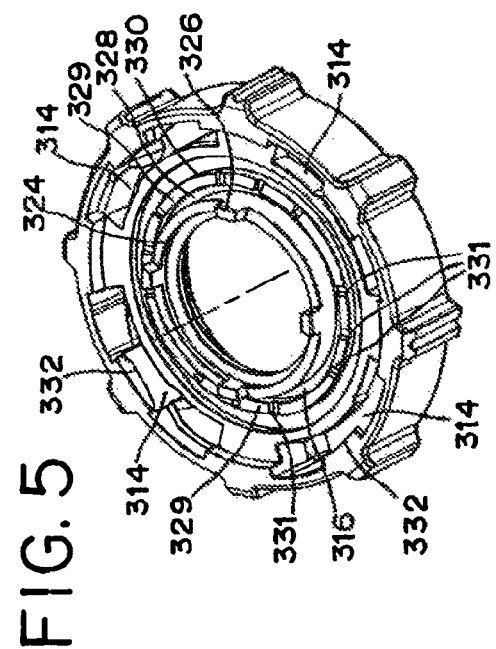
FIG. 5 is a bottom perspective view of the locking collar of FIG. 4.

The locking collar 310 may include ledges 332 extending a short distance radially inward from the outer cylindrical wall 318. The underside of the locking collar 310 is shown in FIG. 5. The locking collar 310 includes an inner circular ridge 324 with one or more tabs 326. Tabs 326 bear on the walls on the base retainer 350 that limit the travel of the engagement members 352 to prevent damage to the flexible elements used for retention. One or more circular grooves 328, 330 may be disposed in the inner ring 316. Circular ridge 329 is disposed between grooves 328, 330 and includes notches 331.

Figure 7:
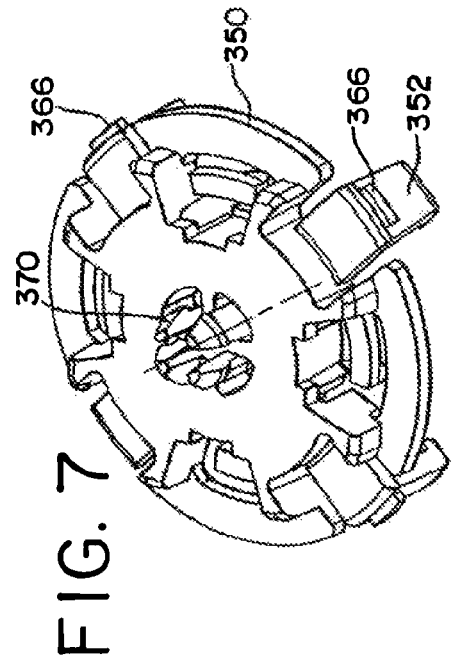
FIG. 7 is a bottom perspective view of the base retainer of FIG. 6.
Figure 6:
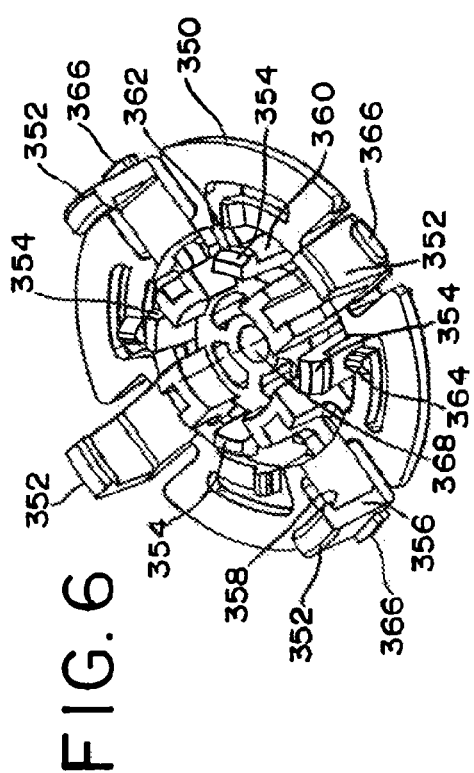
FIG. 6 is a top perspective view of the base retainer of the connection system of FIG. 3A.

An embodiment of the base retainer 350 is shown in FIG. 6. The base retainer 350 includes outer engagement members 352. As will be described in further details below, the outer engagement members 352 are configured to engage the floating ring 210. Although the depicted embodiment shows four outer engagement members 352, other numbers are possible. The base retainer 350 may also include inner engagement members 354. The outer engagement members 352 may include a hook feature and/or a detent mechanism with an axially extending arm 356 and a radially extending lip 358. The inner engagement members 354 may include a hook feature and/or a detent mechanism with an axially extending arm 360 and a radially extending lip 362. Tabs 364 engage the notches 331 on circular ridge 329 of the locking collar 310 to provide a detent stop at each of the configuration positions Ledges 366 extend radially outward from the base portion of engagement members 352 and are used to control the axial position of the engagement members 352 in the different configuration positions. The base retainer 350 may include a center aperture 368, which may be used to connect the base retainer 350 to another object, such as support 20. As shown in FIG. 7, the base retainer 350 includes connectors 370, which may also be used to connect to another object, for example, with a blind hole. Connectors 370 may include a detent feature.

In an alternative embodiment of the base retainer 350, illustrated in FIG. 32, a C-shaped upstand 377 is used to take the compressive load through the assembly disc 252, float retainer 242, and base retainer 350 down onto the supporting structure.

Figure 8:
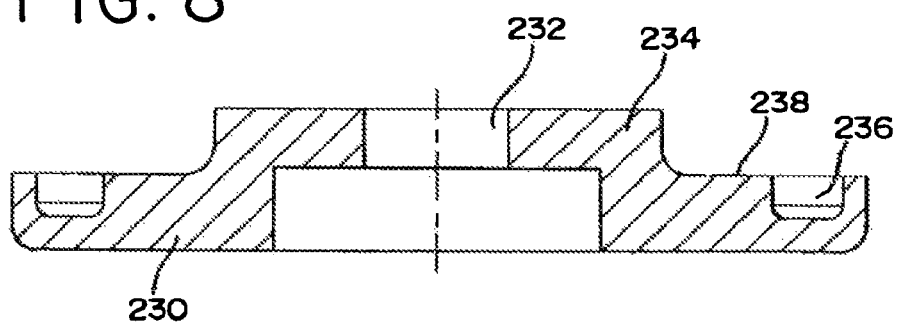
FIG. 8 is a side cross section of the float retainer of the connection system of FIG. 3A.
Figure 9:
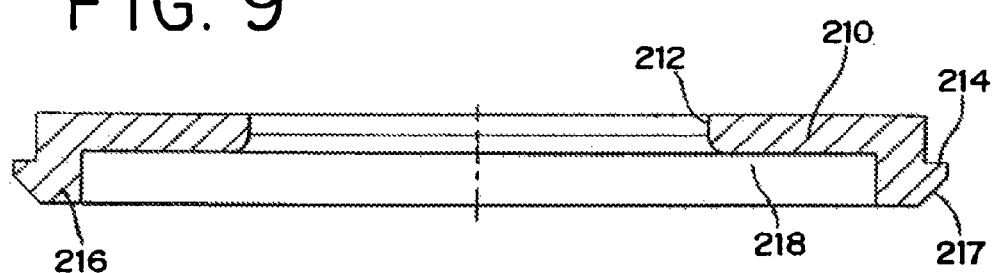
FIG. 9 is a side cross section of the floating ring of the connection system of FIG. 3A.

A side cross sectional view of float retainer 230 is shown in FIG. 8. The float retainer 230 includes a center aperture 232 disposed in a central extending portion 234. The center aperture 232 may be used to attach the float retainer 230 to an object, such as work surface 10. The float retainer 230 may also include a circumferential groove 236, which is configured to hold sealing ring 220. For the alternative embodiment of the float retainer 240 (FIG. 3D), tab 244 engages members 252 on retainer 250 (see FIG. 3C). A side cross sectional view of floating ring 210 is shown in FIG. 9. The floating ring 210 includes a center aperture 212 and an outer peripheral ridge 214. When the float assembly 200 is assembled, the central extending portion 234 of retainer 230 extends through aperture 212 in floating ring 210. The floating ring may also include a flat axial surface 218 surrounded by ridge 216, wherein a surface 238 of the float retainer 230 is disposed against the flat surface 218 and is surrounded by the ridge 216. The floating ring 210 may include a tapered edge 217 to aid in aligning the floating ring 210 with the locking collar 310.

Figure 3B:
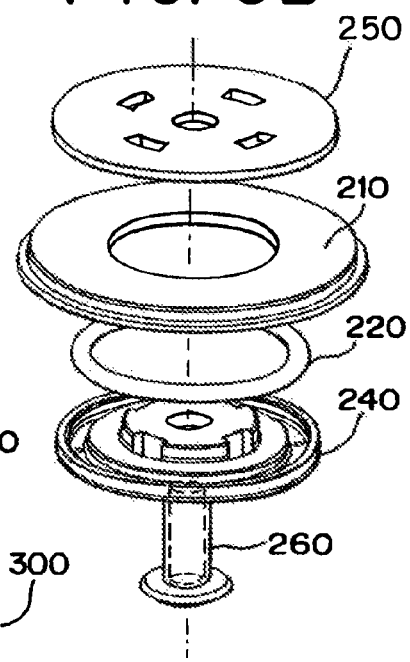
FIG. 3B is an exploded view of another embodiment of a float assembly.
Figure 3C:
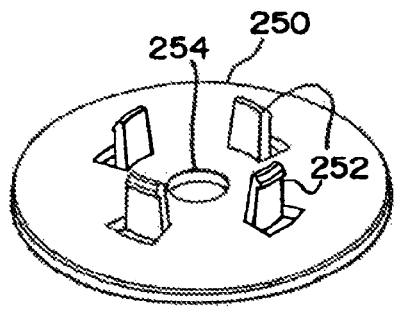
FIG. 3C is a perspective view of an embodiment of a retainer.
Figure 3D:
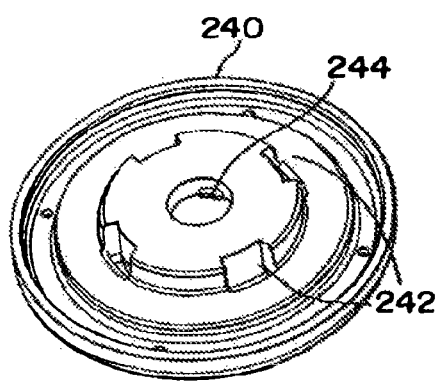
FIG. 3D is a perspective view of an embodiment of a float retainer.
Figure 29:
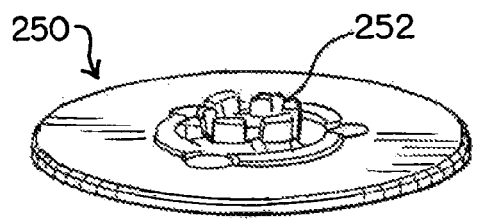
FIG. 29 is a perspective view of another embodiment of a retainer.
Figure 30:
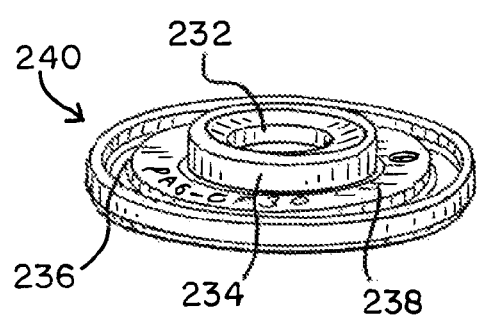
FIG. 30 is a perspective view of another embodiment of a float retainer.

Another embodiment of the float assembly is shown in FIGS. 3B-3D. As shown in FIG. 3B, a retainer 250 may be connected to a work surface 10 or other object by fastener 260. Retainer 250 includes engagement members 252 and aperture 254. Float retainer 240 is essentially similar in most respects to float retainer 230 and includes aperture 244 and slots 242. Engagement members 252 engage slots 242 to secure the float retainer 240 to retainer 250. The float assembly, including floating ring 210, friction ring 220, float retainer 240, and retainer 250, may be assembled and delivered as a complete item which is then fastened to the underside of a work surface 10. Fastener 260 is disposed through apertures 244 and 254 to secure the float assembly to a work surface 10 or other object. In an alternative embodiment shown in FIGS. 29-30, engagement members 252 may also engage the float retainer 240 through the central aperture 232 of the float retainer 240.

Figure 10:
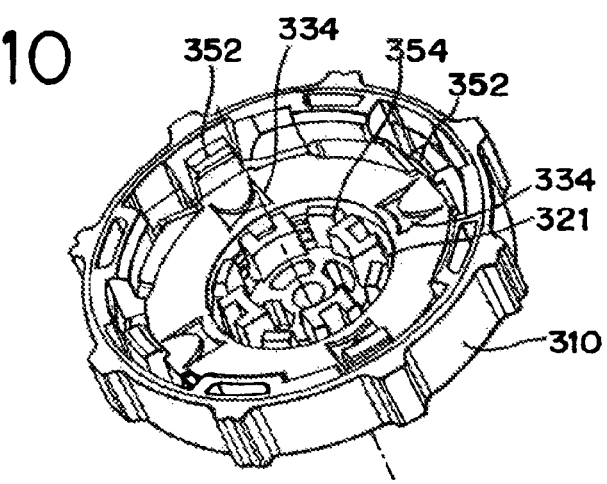
FIG. 10 is a perspective view of the locking assembly of the connection system of FIG. 3A in a load configuration.

Turning now to the assembly of the locking assembly 300, the locking collar 310 is disposed on the base retainer 350, which would generally be attached to an object such as a support 20. The engagement members 352 of the base retainer 350 are inserted through slots 314 in locking collar 310, as shown in FIG. 10. Concurrently, inner engagement members 354 are inserted through apertures 312 and engage the inner portion 321 of the inner ring 316 to hold locking collar 310 in place. The locking collar 310 is rotated with respect to the base retainer 350 so that outer engagement members 352 line up with indicia 334. During this rotation, ledge 332 on the locking collar 310 engages ledge 366 on the base retainer 350 to push the outer engagement members 352 upwards. More specifically, ledge 366 is pushed upwards and rests above ledge 332. The locking assembly is now in a load configuration and is ready to connect to the float assembly 200.

Figure 2:
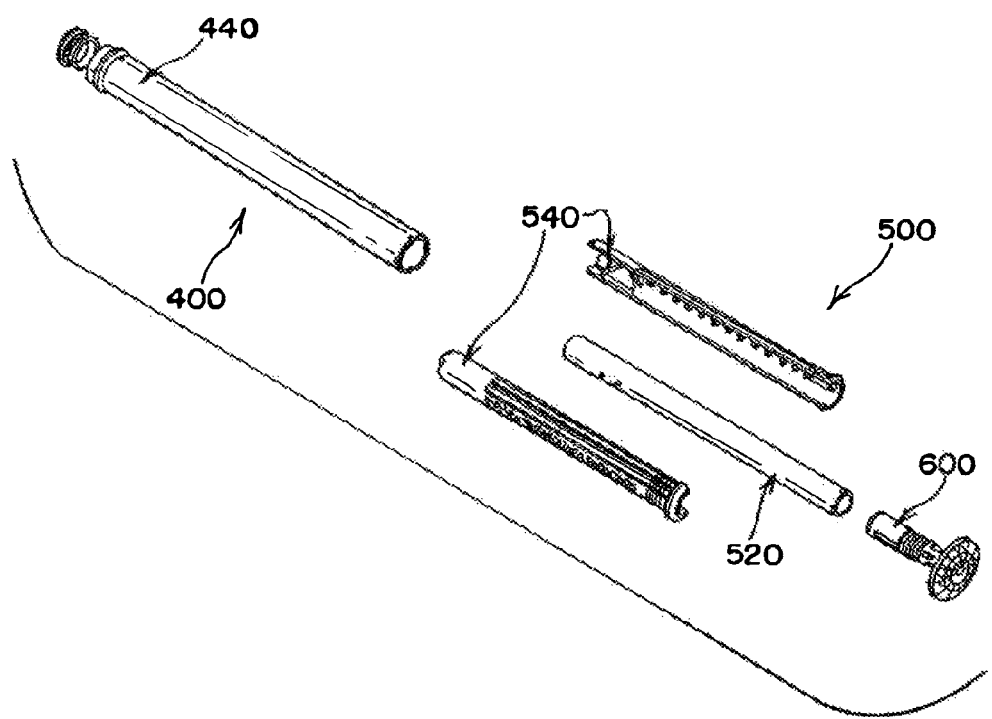
FIG. 2 is an exploded view of a leg assembly.

The float assembly 200 is assembled by inserting the friction ring 220 in the channel 236 in float retainer 230. The central extending portion 234 extends through the aperture 212 in floating ring 210. The float assembly 200 is typically then attached to another furniture object, such as work surface 10. As shown in FIG. 1, several float assemblies 200 may be attached to an object such as work surface 10, with several corresponding locking assemblies 300 attached to an object such as support 20. The locking collar 310 is then aligned with the corresponding floating ring 210, and the floating ring 210 pressed into the locking assembly 300, as shown in FIG. 11. The locking collar 310 helps prevent the components of the float assembly 200 from potentially damaging the engagement members 352. The 'float' or lateral play in the float assembly 200 allows the floating ring 210 to self center with respect to the locking assembly 300. The tapered edge 217 of the floating rings 210 aids in aligning the floating rings 210 with the locking collars 310. The surface 214 of floating ring 210 rests under the lip 358 of engagement members 352. The locking assembly 300 is in the load position, so that float retainer 230 and seal 220 still have 'float' or lateral play with respect to the locking assembly 300. This allows alignment of other float assemblies 200 and locking assemblies 300 that are to be connected in the same manner, and also to adjust the position of the work surface 10 for alignment purposes.

When all of the float assemblies 200 have been connected to the corresponding locking assemblies 300 and the work surface 10 correctly positioned, the locking collars 310 are then rotated to a locked configuration, as shown in FIG. 12. The locking collar 310 is rotated with respect to the base retainer and the float assembly 200. The outer engagement members 352 move relatively along slots 314. The outer engagement members 352 are forced inwards and downwards by wall portions 317, to pull the floating ring 210 towards the locking assembly 300 and hold it securely thereto. The outer engagement members 352 are backed up by the wall portions 317 to prevent release of the floating ring 210. Movement to the locked configuration compresses the seal ring 220 in the float assembly 200 to increase the friction between the float retainer 230 and the floating ring 210, thus fixing the floating ring 210 in place. The float assembly 200 no longer has 'float,' i.e. the float retainer 230 is fixed with respect to the locking assembly 300.

For disassembly, the locking collar 310 may be rotated in the opposite direction, through the load position, to a release position. The outer engagement members 352 are deflected radially outwards, allowing the release of the float assembly 200. In one embodiment, the outer engagement members 352 are deflected outwardly by a ramped surface 315 adjacent the slot 314. The ramped surface 315 urges the engagement members 352 radially outwards, so that the float assembly 200 may be fully disengaged from the locking assembly 300.

The various configurations of the locking assembly 300 (i.e., lock, load, and release configurations) are preferably achievable by a user moving between the configurations without tools. In particular, the configurations may be achieved by rotating the locking collar 310 with respect to the base retainer 350 to rotate the outer engagement members 352 in the slots 314. In the load configuration, the outer engagement members 352 line up with indicia 334 toward the center of slots 314. In an alternative embodiment, the base retainer 350 may have additional indicia (such as letters, colors, or other markings) that line up with indicia 334 to indicate that the assembly 300 is in a load configuration. In the lock configuration, the outer engagement members 352 are adjacent to wall portions 317 at one end of the slots 314. In the release configuration, the outer engagement members 352 are deflected outwardly by ramped surfaces 315 adjacent the opposite end of the slots 314 as in the lock configuration.

Figure 15:
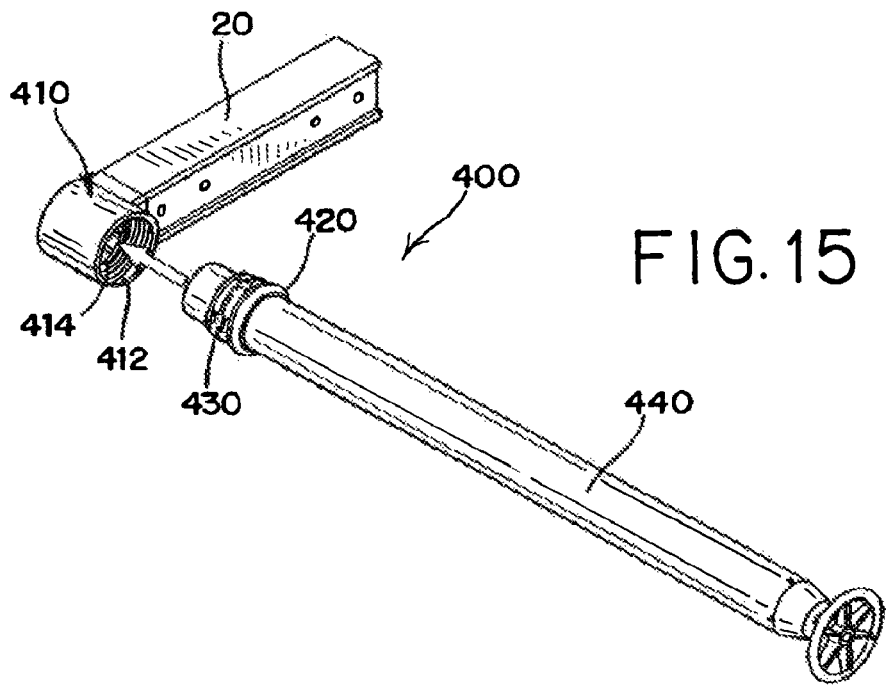
FIG. 15 is a perspective view of the leg attachment system of FIG. 14 and an embodiment of a portion of a support structure.

Another aspect of the furniture system is shown in FIGS. 14-19. As shown in FIGS. 14 and 15, a furniture leg attachment system 400 includes a plug member 410 disposed in support 20, a release collar 420, a locking collar 430, and a leg tube 440. The plug member 410 includes an opening 412 and an interior surface 414 with a threaded portion 416 and toothed portion 418, as shown in FIG. 17A. The leg tube 440 includes a circumferential shoulder 442, and a channel or hole 444 disposed through the leg tube 440 adjacent the circumferential shoulder 442. In use, the release collar 420 and locking collar 430 are disposed around the leg tube 440 and are axially slidable with respect to the leg tube 440 during assembly.

To assemble the furniture leg attachment system 400, the release collar 420 is pressed on to the locking collar 430 and both components are slid onto the leg tube 440 and moved to a position adjacent the circumferential shoulder 442. A pin 402 is then slid through slot 432 in locking collar 430 and into hole 444 in leg tube 440. The length of the pin 402 is such that the ends 403 remain in slot 432. The presence of pin 402 in slot 432 prevents rotation of the locking collar 430 with respect to leg tube 440 but allows axial movement of the pin 402 along the length of the slot 432. The release collar 420 is then slid onto the leg tube 440 adjacent the locking collar 430.

Figure 18A:
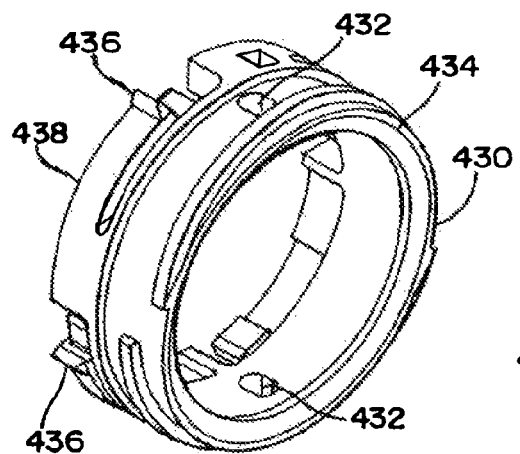
FIG. 18A is a perspective view of an embodiment of a locking collar.
Figure 18B:
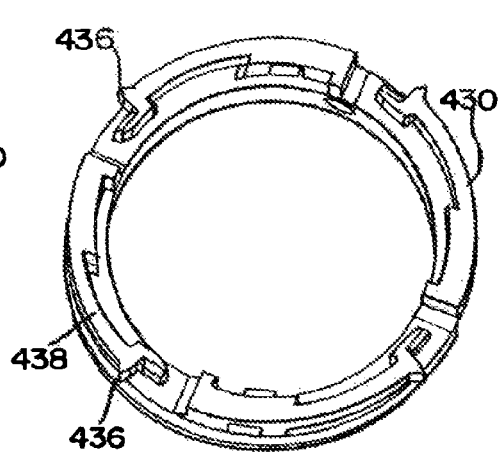
FIG. 18B is a top perspective view of an embodiment of a locking collar.
Figure 19:
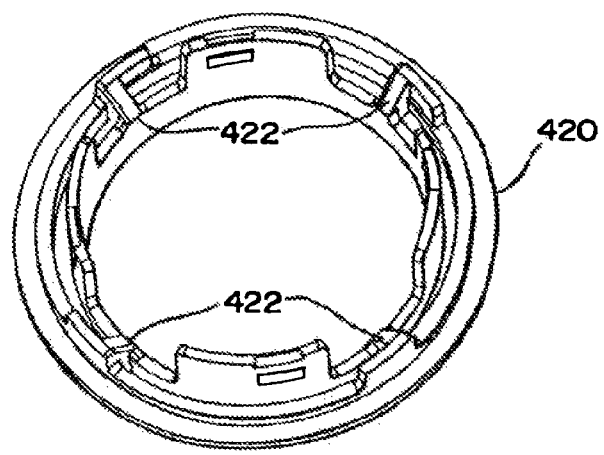
FIG. 19 is a perspective view of an embodiment of a release collar.

As shown in FIGS. 18A and 18B, the locking collar 430 includes a threaded portion 434 and ratchet members 436 on ratchet arms 438. The ratchet members 436 form part of a ratchet mechanism with toothed portion 418 of the plug 410. The ratchet members 436 are configured to engage the toothed portion 418 of the plug member 410 such that locking collar 430 may be threaded into plug 410, with the ratchet members 436 allowing of the rotation of the locking collar 430 in only one direction, to secure the leg tube 440 within the plug member 410. A release collar 420 is disposed adjacent the locking collar 430 and is configured to release the ratchet members 436. The release collar 420 includes ramped surfaces 422 extending to the ratchet members 436 to disengage them from the toothed portion 418. In particular, when the release collar 420 is pushed towards the locking collar 430, ramped surfaces 422 engage ratchet arms 438 to urge them radially inwards, thus disengaging ratchet members 436 from toothed portion 418 of the plug 410 to allow locking collar 430 to be unthreaded from plug member 410.

Figure 16:
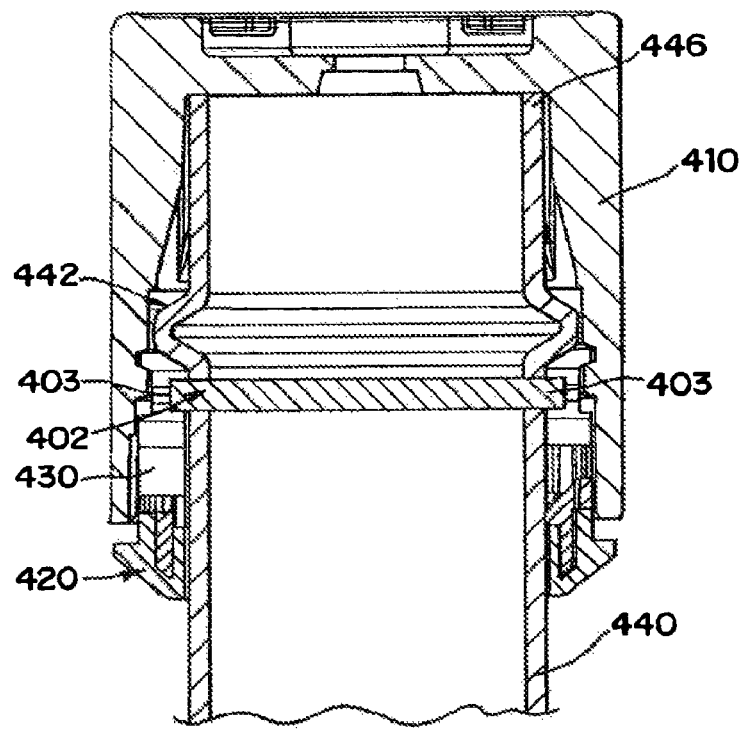
FIG. 16 is a side sectional view of a portion of the leg attachment system and support structure of FIG. 14.

The leg tube 440 is inserted into the plug member 410. As the leg tube 440 is rotated, the pin 402 and locking collar 430 also rotate. As the threaded portion 434 of the locking collar 430 engages the internal thread 416 of the plug member 410, 410 the locking collar 430 and leg tube 440 are drawn up into the plug 410. When the end 446 of tube 440 bottoms out in the plug 410, further rotation of the leg tube 440 causes the locking collar 430 to be drawn further up into the leg plug 410 and along the leg tube 440 until the locking collar 430 contacts the circumferential shoulder 442, as shown in FIG. 16. During this process the ratchet members 436 on the locking collar 430 engage the toothed surface 418 in the plug 410 to prevent reverse rotation of the locking collar 430 and thus loosening of the leg tube 440.

To remove the leg tube 440, the release collar 420 is pressed to disengage the arms 438 and teeth 436 from the toothed surface 418 of the plug member 410. This allows free rotation of the leg tube 440 in the reverse direction. The leg tube 440 can then be rotated and the locking collar 430 disengaged from the threaded portion 418 of the leg plug 410.

Other orientations of the components of the furniture leg attachment system 400 are possible. The locations of the threaded portions 416, 434 and ratchet portions 418, 436 may be switched, separate parts may be combined into single parts (e.g., locking collar 430 and release collar 420 may be formed as a single part), and so forth. As shown in FIGS. 17A and 17B, the system may include different types of plug members. Plug member 410 may be used for generally vertical legs, and angled plug member 411 may be used for legs disposed at an angle other than 90° from the work surface support 20. The leg tube of FIG. 17A includes end portion 439 with a length 443 from the shoulder 442 to the end 446 of the tube. The leg tube of FIG. 17B includes end portion 437 with a length 441 from the shoulder 442 to the end 446 of the tube. Plug members 410, 411 have interior plug lengths 447, 445, corresponding to end portion lengths 443, 441, respectively. Plug member 410 includes an interior boss 421 that fits into recess 423 in the top of end portion 430. In contrast, the top portion 437 includes an end cap 425. If a leg tube 440 is placed in the proper plug member, the thread heights match and the leg tube 440 may be rotated to the locked position. If the end 439 of the leg tube 440 is placed in the plug member 411 of FIG. 17B, the length 443 is longer than length 445 and thus the leg tube 440 cannot engage the threads 416 of plug member 411. If the end 437 of the leg tube 440 is placed in the plug member 410 of FIG. 17A, end cap 425 is blocked by interior boss 421, thus preventing the leg tube 420 from being secured. Additionally, the leg plugs 410 and leg tubes 440 may be color coded or otherwise marked so as to indicate which leg tube 440 is supposed to be matched with which plug 410.

Another aspect of the furniture system includes a height adjustable leg assembly 500, as shown in FIG. 20. The leg assembly includes an upper leg tube 510, a lower leg tube 520, a sleeve 540, and locking lobe 550. The upper leg tube 510 is configured to be connected to another object, such as support 20 or work surface 10. The lower leg tube 520 supports the upper leg tube 510 via the sleeve 540. The lower leg tube 520 includes one or more pins 522 radially extending from the lower leg tube 520. In one embodiment, the lower leg tube 520 includes two pins 520 extending from opposite sides of the lower leg tube 520. The sleeve 540 surrounds at least a portion of the lower leg tube 520 and is disposed between the lower leg tube 520 and the upper leg tube 510 when the height adjustable leg assembly 500 is fully assembled. The locking lobe 550 is held in position at one end of the sleeve 540.

As best seen in FIGS. 23 and 24, the sleeve 540 includes a vertical channel 542 configured for sliding movement of the pin(s) 522. A plurality of recesses 532 are disposed adjacent to the vertical channel 542 and in communication thereto, allowing the pins 522 to move from the vertical channel 542 to the recesses 532. The recesses 532 may include a side channel 532 that extends slightly upward from the vertical channel 542 and a niche 536 wherein the pin 522 rests. The niche 536 may provide a snap fit connection with the pin 522. The vertical channel 542 and recesses 532 may be formed on at least the inner surface 541 of the sleeve 540. In one embodiment, the sleeve 540 includes two halves 544, 546 which connect together around lower leg tube 520. Each half 544, 546 includes a pattern with a vertical channel 542 and recesses 532. The patterns on each half 544, 546 are not mirror images, but are rather reversed images, so that rotation of the lower tube 520 (and thus pins 522) causes movement of the pins 522 on each side of the lower leg member 520 from the vertical channel 542 to the recesses 532.

In operation, the lower leg tube 520 is moveable from a first configuration where the lower leg tube 520 slides vertically with respect to the sleeve 540, and a second configuration wherein the lower leg tube 520 is vertically fixed with respect to the sleeve 540. To assemble the height adjustable leg 500, the clam shell-type longitudinally extending pieces 544, 546 of the sleeve 540 are positioned around the lower leg tube 520, as shown in FIG. 20. The locking lobe 550 is positioned at one end of the sleeve 540 and is surrounded at least in part by the sleeve 540. The pins 522 are positioned so that they are disposed in the vertical channels 542 in the sleeve 540. The two sleeve pieces 544, 546 are then connected together. The sleeve pieces 544, 546 may be joined by any suitable arrangement, such as pins and channels or tabs and slots.

As shown in FIG. 21, the lower leg tube 520 and the sleeve 540 are then aligned with the upper leg tube 510. The sleeve 540 is inserted into the upper leg tube 510. The locking lobe 550 exerts an outward force against the sleeve 540 to maintain the sleeve 540 against the interior of leg tube 510. The sleeve 540 may include anti-rotation tabs 514 that engage slots 512 in upper leg tube 510 to prevent rotation of the sleeve 540 with respect to the upper leg tube 510, as shown in FIG. 22. A downward force on the sleeve 540 (or an upward force on the lower leg tube 520) engages the pin 522 in recesses 532 and an upward force disengages the pin 522 from the recesses 532.

As shown in FIGS. 23 and 24, in the locked position, the pins 522 are located in the niches 536 in the sleeve 540. The vertical channel 542 allows movement of the pin 522 up and down with respect to the upper leg tube 510. The pins 522 may not be dislodged from niche 536 by a simple twisting of the lower leg tube 520. In locking or unlocking the leg assembly 500, the pull and twist of the lower leg tube 520 forces the pins 522 out of the snap features in recesses 532 and allows the pins 522 to move into the vertical channel 542.

The height of the leg assembly 500 can be controlled by rotating the lower leg tube 520 such that the pins 522 are disposed in the vertical channel 542. The desired height of the leg assembly 500 is then selected. The lower leg tube 520 is then rotated back, so that the pins 533 engage recesses 532 and form snap connections with niches 536. The leg assembly 500 may include markings or indicia to indicate the location of the recesses 532.

Figure 25:
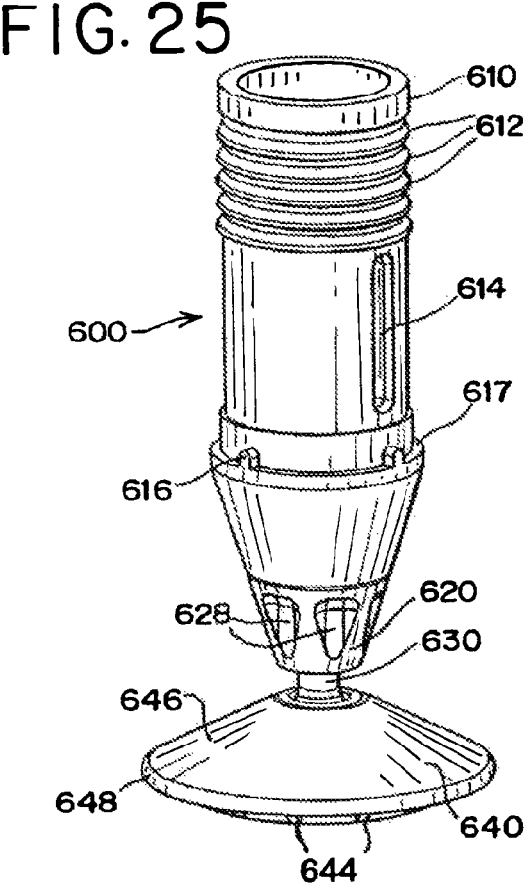
FIG. 25 is a perspective view of an embodiment of a glide assembly.
Figure 26:
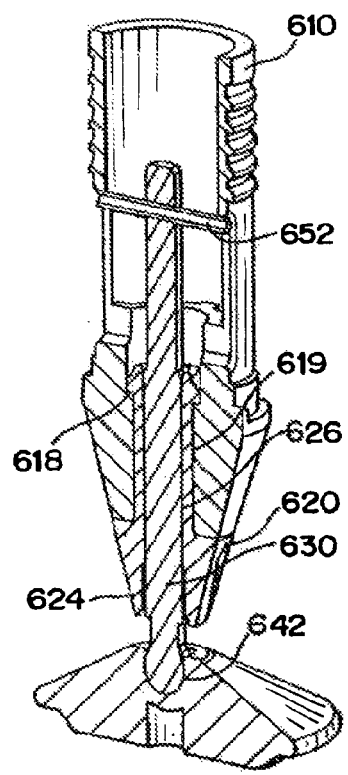
FIG. 26 is a side sectional view of the glide assembly of FIG. 25.

An embodiment of a glide assembly 600 is shown in FIG. 25. The glide assembly 600 includes a leg insert 610, collar 620, shaft 630, and base 640. The base 640 and shaft 630 preferably do not rotate with respect to the leg insert 610. This configuration ensures consistent height-adjustment performance regardless of floor surfaces (e.g. hard floor v. soft carpet). In particular, for conventional glides, the glide height is adjusted by rotating the base itself against the friction of the floor surface. On a hard floor the base is relatively easy to rotate, while on a soft carpet the base tends to dig into the floor and make rotation much more difficult. The glide assembly 600 does not rotate the base 630 itself, so that the height adjustment is related to the internal friction of the components rather than the interface with the floor. The height of the glide assembly 600 may be adjusted by rotating the collar 620 on the glide assembly 600, while the other components maintain alignment with the leg tube (such as lower leg tube 520). The design of the glide assembly 600 also offers limits of vertical travel in both directions. This prevents the possibility of accidentally unscrewing the glide assembly 600, or damaging visible components.

Figure 27:
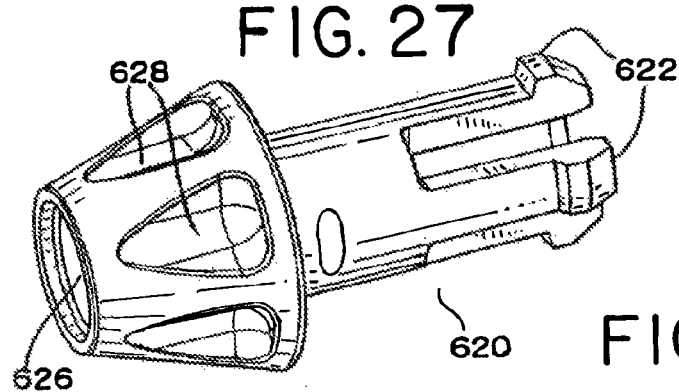
FIG. 27 is a perspective view of an embodiment of a collar.

The leg insert 610 includes ribs 612, vertical slot 614, protrusions 616, central channel 619, and shoulder 618. As shown in FIG. 27, the actuation collar 620 includes snap-fit features 622, threaded portion 624 (not visible), central channel 626, and gripping recesses 628. The threaded portion 624 may be formed integrally with the collar 620. Alternatively, the threaded portion 624 may be provided as an insert that is press-fitted into the bottom of the collar 620. The actuation collar 620 is snap-fitted into the leg insert 610. Snap-fit connectors 622 engage shoulder 618 to hold the collar 620 in place. The actuation collar 620 can freely rotate in the leg insert 610. The actuation collar 620 is used to adjust the height of the glide assembly 600, as described below.

Figure 28:
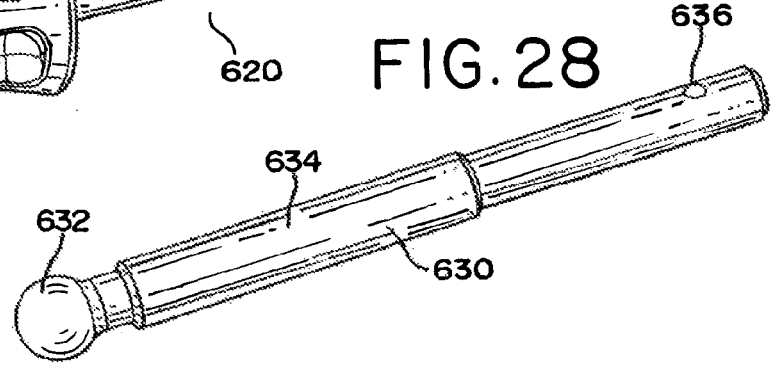
FIG. 28 is a perspective view of an embodiment of a pin.

As shown in FIG. 28, shaft 630 includes ball end 632, threaded shoulder 634, and hole 636. The shaft 630 is inserted into the end of the actuation collar 620 until the threaded shoulder 634 of the shaft 630 meets the threaded portion 624 in the channel 626 in the actuation collar 620. The shaft 630 is rotated so that the threaded shoulder 634 engages the matching threads 624 in the collar 620 until the hole 636 in the end of the stud 630 is aligned with the bottom of the slot 614 in the side of the leg insert 610.

A pin 652 is pressed into the hole 636 through the slot 614, so the ends of the pin 652 run in the slots 614 down opposing sides of the leg insert 610. The pin 652 engages slot 614 on the leg insert 610 to prevent rotation of the shaft 630 in the glide assembly 600. In an alternatively embodiment (not shown), slot 614 is disposed in the shaft 630, with the pin 652 disposed in the slot 614 and the ends of the pin 652 affixed to leg insert 610. The collar 620 is rotated to move the shaft 630 up or down in the slots 614 to adjust the height of the glide assembly 600. Because the collar 620 is rotatable with respect to the leg insert 610 but threaded with respect to shaft 630, rotation of the collar 620 causes vertical movement of the shaft 630, with the pin 652 moving up or down in slot 614. Once the shaft 630 is in place in collar 620, the snap features 622 of the collar 620 are backed-up by the shaft 630, so the collar 620 cannot be removed without removing shaft 630. The glide base 640 is then pressed onto the ball feature 632 on the end of the stud 630.

The ball feature 632 on the end of the shaft 630 engages the base 640. The top of the base 640 has an undercut ball feature 642 which snap-fits onto the end of the shaft 630. The underside of the base 640 may be ribbed to reduce localized pressure. The ribs 644 protrude below the bottom of the equator 648 from the underside of the top surface 646, to lift the visible portion of the base 640, particularly on soft carpets. The base 640 is also designed to provide a ramp feature to lift the base 640 slightly as it is pushed across a floor, so upon impact with thresholds, for example, the leg should bounce over, rather than jamming and damaging structure.

In an alternative embodiment illustrated in FIG. 33, the glide base 640 may be a deliberately flexible component. In this embodiment, the peripheral edge 641 of the glide base 640 contacts the floor, and the load from the table is exerted through the stud feature 643 which snap-fits onto the end of the shaft 630. As such, the portion of material in between the peripheral edge 641 and the stud feature 643 may act as a spring, allowing the central loaded area to drop as far as floor level. This spring action protects both the inserts in the worktops, and the float and locking assemblies from very high short-term loads created by impacts on the worktop. By acting as a spring, the glide base 640 decelerates loads over a longer time period and reduces the peak forces throughout the assemblies.

The glide assembly 600, and in particular leg insert 610, is pressed into the end of a leg tube (such as leg tube 520, as shown in FIG. 1) where interference with the ribs 612 with the interior of leg tube 520 prevents vertical movement. The protrusions 616 on the lower step feature 617 of the insert 610 engage cut-outs in the end of the leg tube to prevent rotation of the insert 610. Once the assembly 600 is pressed into the end of the leg tube the shaft 630 is completely retained. Only the base 640 can be removed once the glide assembly 600 is placed in the leg tube (such as lower leg tube 520). Complete removal of the assembly 600 from the leg tube is required to disassemble the glide assembly 600 into the component parts.

The components of the various systems described herein, including connection system 100, leg attachment system 400, height adjustable leg assembly 500, and glide assembly 600, may be combined in whole or in part with each other. The systems and/or their component parts may be used alone, or in combination with other furniture systems. The various components may be made of any suitable material, and are preferably made of plastic or metal. In particular, various components may be made from Nylon; 10% GF Nylon; 20% GF Nylon; 30% GF Nylon; Delrin®; steel; and various other materials.

Although the present invention has been described with reference to preferred embodiments, those skilled in the art will recognize that changes may be made and formed in detail without departing from the spirit and scope of the invention. It is therefore intended that the foregoing detailed description be regarded as illustrative rather than limiting, and that it be understood that it is the following claims, including all equivalents, that are intended to define the scope of this invention.

What is claimed is:

1. A furniture leg attachment system comprising:
a plug member comprising:
  an opening; and
  an interior surface comprising a threaded portion and toothed portion;
a leg tube comprising a circumferential shoulder, a first end of the leg tube disposed in the opening of the plug member; and
a collar disposed around the leg tube adjacent the circumferential shoulder and axially slidable and rotationally fixed with respect to the leg tube, the collar comprising:
  a threaded portion configured to engage the threaded portion of the plug member; and
  a ratchet mechanism configured to engage the toothed portion of the plug member;
a release mechanism configured to release the ratchet mechanism; wherein the collar further comprises a first collar, wherein the release mechanism comprises a second collar disposed adjacent the first collar, with the first collar disposed between the second collar and the circumferential shoulder; and wherein said release mechanism is movable in an axial direction relative to the ratchet mechanism.

2. The leg attachment system of claim 1 wherein the leg tube comprises a hole and the collar comprises a slot, further comprising a pin disposed in the hole and engaging the slot, such that the collar rotates with the leg tube and is axially movable respect to the tube along a length of the slot.

3. The leg attachment system of claim 1 wherein the second collar comprises at least one tab extending to the ratchet mechanism to disengage it.

4. The leg attachment system of claim 1 wherein the collar is moveable from a first configuration, where the leg tube can be rotated in only one direction, to a second configuration, where the leg tube may be rotated in the opposite direction, by engaging the release mechanism.

5. The leg attachment system of claim 1 wherein the plug member is disposed in a work surface support.

6. A method of assembling a furniture leg attachment system, comprising:
providing a plug member comprising:
  an opening; and
  an interior surface comprising a threaded portion and toothed portion;
providing a leg tube comprising a circumferential shoulder;
providing a collar comprising a threaded portion and a ratchet mechanism;
disposing the collar on the leg tube adjacent the circumferential shoulder, such that the collar is rotationally fixed with respect to the leg tube;
disposing a first end of the leg tube in the opening of the plug member;
rotating the leg tube to engage the threaded portion of the collar with the threaded portion of the plug member, and the ratchet mechanism of the collar with the toothed portion of the plug member, thereby securing the leg tube to the plug member;
moving the collar axially relative to the leg tube while rotating the leg tube engaging a release mechanism and thereby disengaging the ratchet mechanism from the toothed portion of the plug member, and removing the leg tube from the plug member; and wherein the collar further comprises a first collar, wherein the release mechanism comprises a second collar disposed adjacent the first collar, with the first collar disposed between the second collar and the circumferential shoulder.

7. A furniture system comprising:
a work surface;
a floating ring;
a float retainer disposed against the floating ring and secured to the work surface, with the floating ring disposed between the float retainer and the work surface;
a work surface support comprising a plug member comprising:
  an opening; and
  an interior surface comprising a threaded portion and toothed portion;
a locking collar;
a base retainer coupled to the locking collar and attached to the work surface support, and comprising an engagement member connected to the floating ring, wherein the locking assembly is moveable between a first configuration wherein the float retainer is moveable relative to the locking collar and a second configuration wherein the float retainer is fixed relative to the locking collar;
an upper leg tube comprising a circumferential shoulder;
a collar disposed around the upper leg tube adjacent the circumferential shoulder, and axially slidable and rotationally fixed with respect to the leg tube, the collar comprising:
  a threaded portion engaging the threaded portion of the plug member; and
  a ratchet mechanism engaging the toothed portion of the plug member;
a release mechanism disposed adjacent the collar and configured to release the ratchet mechanism; wherein the collar further comprises a first collar, wherein the release mechanism comprises a second collar disposed adjacent the first collar, with the first collar disposed between the second collar and the circumferential shoulder; and wherein said release mechanism is movable in an axial direction relative to the ratchet mechanism;

a lower leg tube supporting the upper leg tube and comprising at least one pin extending from the lower leg tube; and a sleeve disposed around at least a portion of the lower leg tube, comprising:
- a vertical channel configured for axial sliding movement of the pin; and
- a plurality of recesses in communication with the vertical channel and disposed and configured to engage the at least one pin with a snap fit connection, wherein the lower leg tube is moveable from a first configuration where the lower leg tube slides vertically with respect to the sleeve, and a second configuration wherein the lower leg tube is vertically fixed with respect to the sleeve.

8. The leg attachment system of claim 1 wherein the leg tube comprises an upper leg tube supported by a lower leg tube.

9. The leg attachment system of claim 8 wherein the upper and lower leg tubes are vertically adjustable relative to each other.

10. The leg attachment system of claim 5 further comprising a work surface supported by the work surface support.

11. The leg attachment system of claim 10 wherein the work surface and the work surface support are laterally adjustable relative to each other.

12. The leg attachment system of claim 1 wherein the plug member comprises an axially extending interior boss, and wherein the first end comprises a recess opening toward the boss, wherein the interior boss is received in the recess.

13. The leg attachment system of claim 10 wherein the leg tube extends substantially perpendicular to the work surface.

14. The leg attachment system of claim 10 wherein the leg tube forms an oblique angle relative to the work surface.

15. The method of claim 6 wherein the engaging of the release mechanism comprises moving the release mechanism axially and thereby disengaging the ratchet mechanism from the toothed portion of the plug member.

* * * * *